*(12)* United States Patent
Song

(10) Patent No.: US 11,977,147 B2
(45) Date of Patent: May 7, 2024

(54) APPARATUS FOR ASSISTING DRIVING AND METHOD THEREOF

(71) Applicant: HL KLEMOVE CORP., Incheon (KR)

(72) Inventor: Seungmok Song, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 178 days.

(21) Appl. No.: 17/236,223

(22) Filed: Apr. 21, 2021

(65) Prior Publication Data

US 2021/0354698 A1 Nov. 18, 2021

(30) Foreign Application Priority Data

Apr. 21, 2020 (KR) .................. 10-2020-0048066

(51) Int. Cl.
*G01S 13/86* (2006.01)
*B60W 30/18* (2012.01)
*G06V 20/58* (2022.01)

(52) U.S. Cl.
CPC ..... *G01S 13/867* (2013.01); *B60W 30/18163* (2013.01); *G06V 20/58* (2022.01);
(Continued)

(58) Field of Classification Search
CPC ......... B60W 2420/42; B60W 2420/52; B60W 2552/53; B60W 2554/4041;
(Continued)

(56) References Cited

U.S. PATENT DOCUMENTS 9,180,882 B1 * 11/2015 Dolgov ........... B60W 60/00272
9,869,754 B1 * 1/2018 Campbell ............. G01S 7/4815
(Continued)

FOREIGN PATENT DOCUMENTS

DE 102018009028 A1 * 6/2019 ............. B60Q 1/346
EP 2492165 A1 * 8/2012 .......... B60W 30/143
(Continued)

*Primary Examiner* — Babar Sarwar
(74) *Attorney, Agent, or Firm* — Hauptman Ham, LLP

(57) ABSTRACT

Provided is an apparatus for assisting driving of a host vehicle, the apparatus comprising: a first sensor mounted to a host vehicle and having a field of view in front of the host vehicle, the first sensor configured to acquire front image data; a second sensor selected from a group consisting of a radar sensor and a Light Detection and Ranging (LiDAR) sensor and mounted to the host vehicle, the second sensor configured to have a field of sensing in front of the host vehicle and acquire front sensing data; a third sensor selected from a group consisting of a radar sensor and a LiDAR sensor and mounted to the host vehicle, the third sensor configured to have a field of sensing behind the vehicle and acquire rear side sensing data; and a controller including a processor configured to process the front side sensing data and the rear side sensing data; wherein the controller is configured to: in response to a lane change command being input, acquire position information and velocity information of other vehicle traveling in another lane corresponding to the lane change command based on the rear side sensing data, and output a driving signal for changing a distance between the host vehicle and a preceding vehicle based on the position information and the velocity information of the other vehicle.

20 Claims, 9 Drawing Sheets

(52) U.S. Cl.
CPC . *B60W 2420/403* (2013.01); *B60W 2420/408* (2024.01); *B60W 2554/4041* (2020.02); *B60W 2554/4042* (2020.02); *B60W 2554/802* (2020.02); *B60W 2720/10* (2013.01); *B60W 2754/30* (2020.02)

(58) Field of Classification Search
CPC ... B60W 2554/4042; B60W 2554/802; B60W 2720/10; B60W 2754/30; B60W 30/16; B60W 30/18163; B60W 60/001; G01S 13/865; G01S 13/867; G01S 13/931; G01S 17/931; G01S 2013/93185; G01S 2013/9319; G06V 20/58
See application file for complete search history.

(56) References Cited

U.S. PATENT DOCUMENTS

| | | | | |
|---|---|---|---|---|
| 10,293,819 | B1* | 5/2019 | El-Khatib | B60W 60/00274 |
| 10,569,770 | B1* | 2/2020 | You | B60W 30/0956 |
| 10,850,737 | B2* | 12/2020 | Kim | B60W 60/00276 |
| 11,119,491 | B2* | 9/2021 | Jammoussi | B62D 15/025 |
| 11,227,498 | B2* | 1/2022 | Shinohara | G08G 1/167 |
| 11,505,189 | B2* | 11/2022 | Lee | B60W 50/035 |
| 2008/0055114 | A1* | 3/2008 | Kim | G01S 15/931 701/1 |
| 2016/0114798 | A1* | 4/2016 | Kim | G01S 13/867 701/41 |
| 2017/0369076 | A1* | 12/2017 | Goo | B60W 50/082 |
| 2018/0101736 | A1* | 4/2018 | Han | G02B 27/01 |
| 2018/0118215 | A1* | 5/2018 | Kim | B60W 60/0015 |
| 2018/0345978 | A1* | 12/2018 | Fujii | B60W 30/18163 |
| 2018/0370527 | A1* | 12/2018 | Rachor | B60W 30/16 |
| 2019/0193738 | A1* | 6/2019 | Oh | G05D 1/0251 |
| 2019/0256104 | A1* | 8/2019 | Shimizu | B60W 50/0098 |
| 2020/0172105 | A1* | 6/2020 | Ahmed | B60W 30/18163 |
| 2020/0189598 | A1* | 6/2020 | Eigel | B60W 10/20 |
| 2020/0238904 | A1* | 7/2020 | Kim | B60W 10/20 |
| 2021/0031772 | A1* | 2/2021 | Gomora | B60W 30/09 |
| 2022/0397402 | A1* | 12/2022 | Bolless | G08G 1/096725 |

FOREIGN PATENT DOCUMENTS

| | | | | |
|---|---|---|---|---|
| EP | 2492165 | A1 | 8/2021 | |
| KR | 101954319 | B1 | 6/2019 | |
| WO | WO-2021117132 | A1 * | 6/2021 | B60W 30/143 |

* cited by examiner

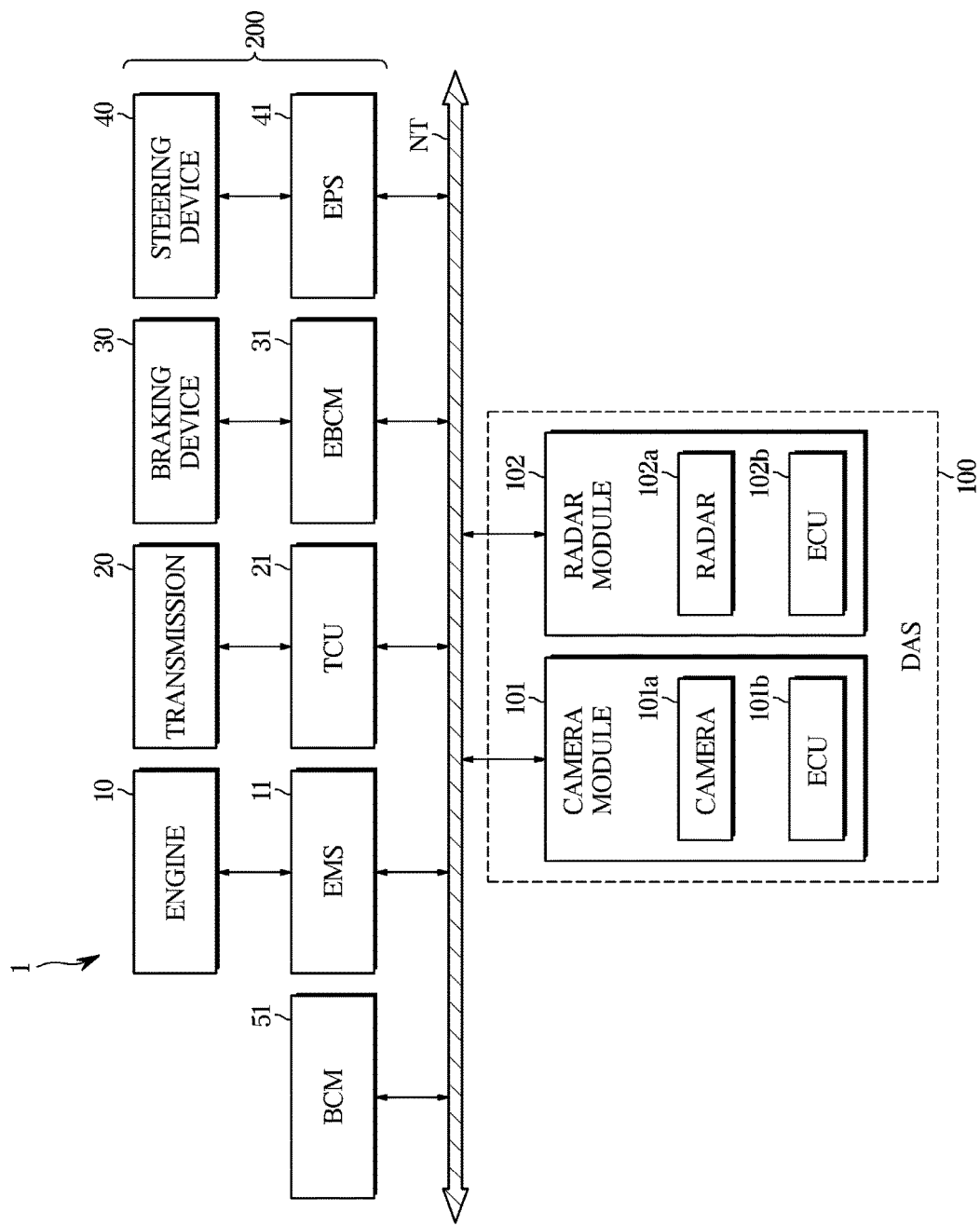
[FIG. 1]

[FIG. 2]
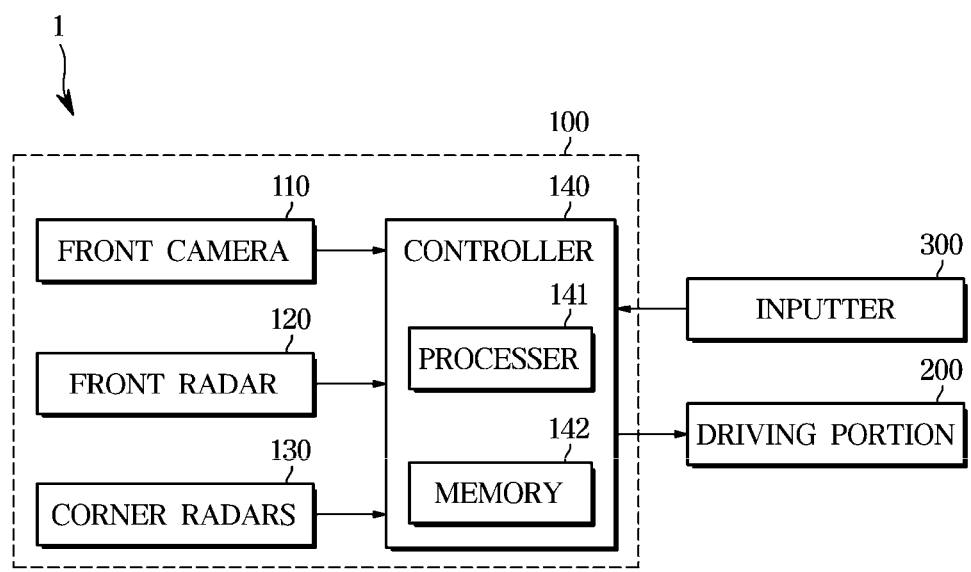

[FIG. 3]
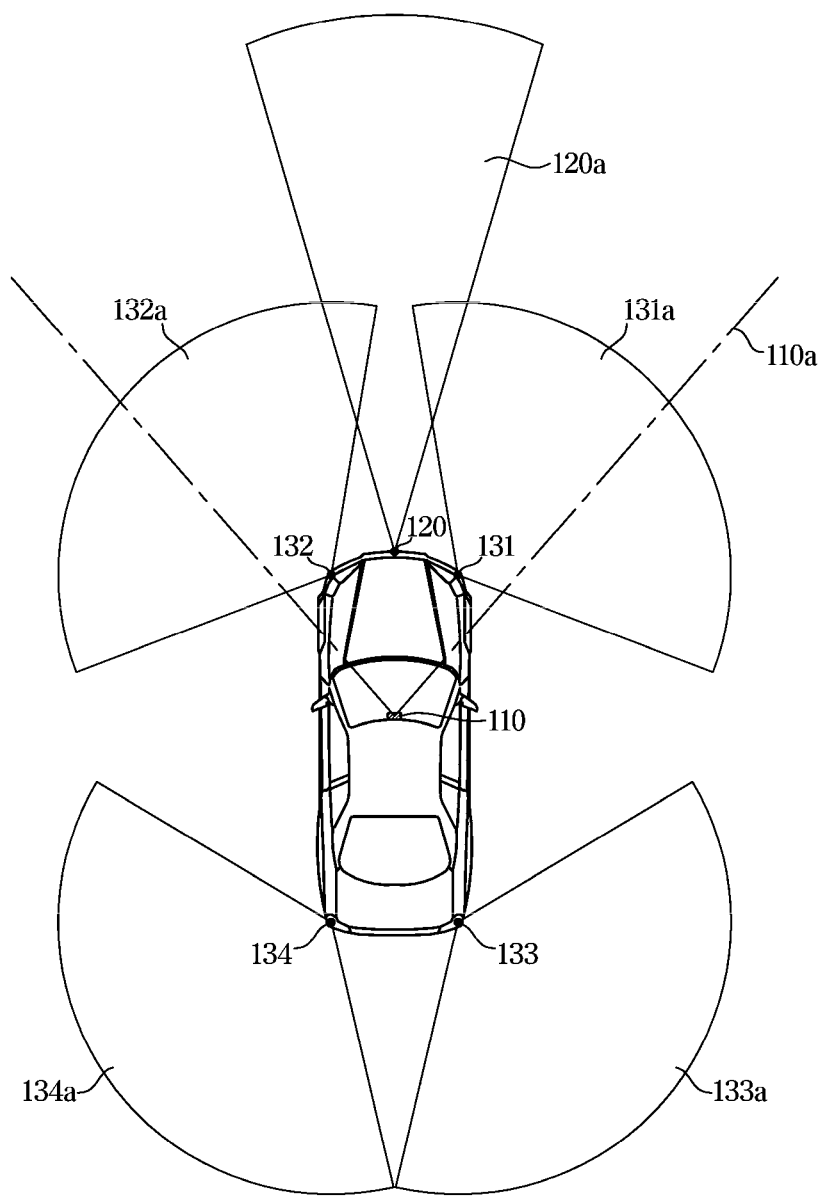

[FIG. 4]
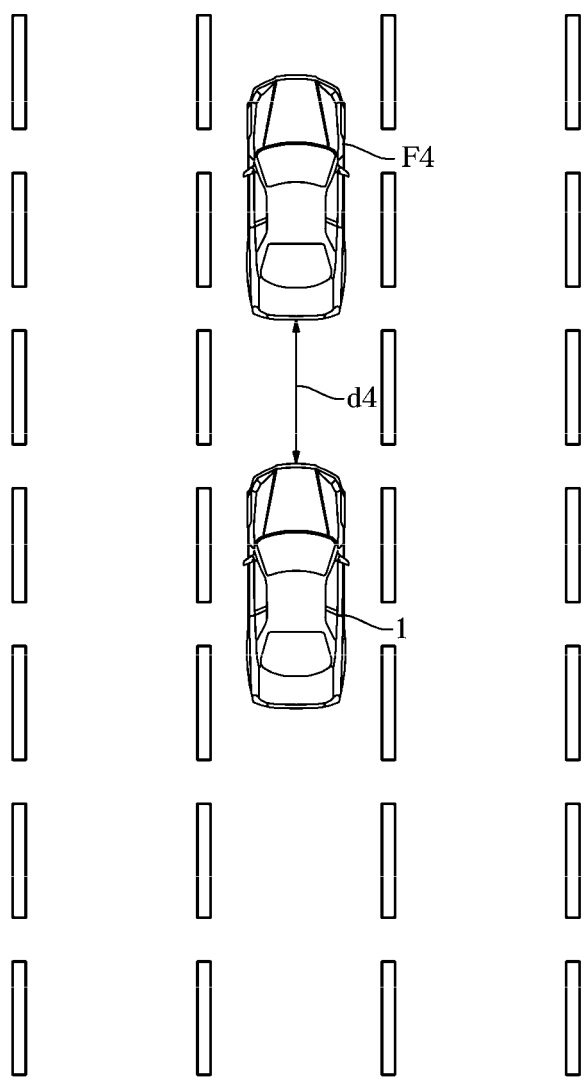

[FIG. 5]
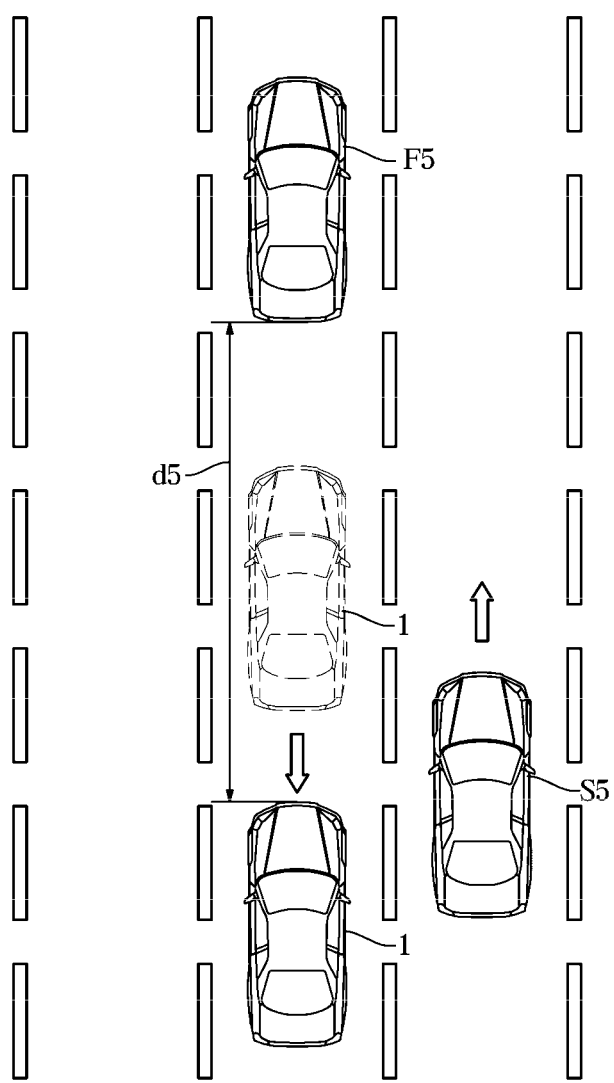

[FIG. 6]
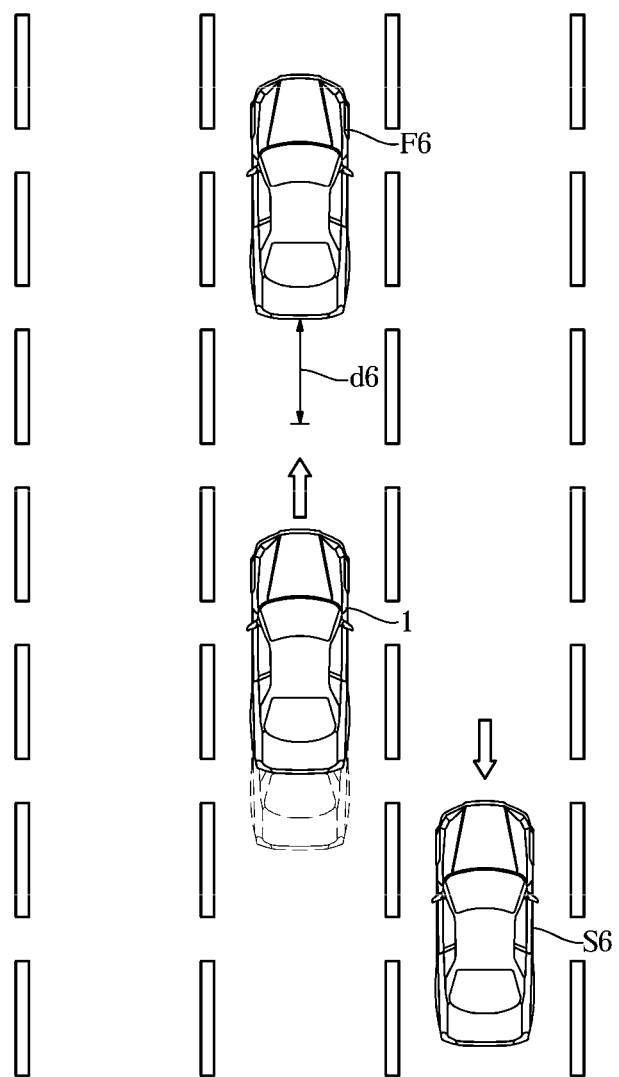

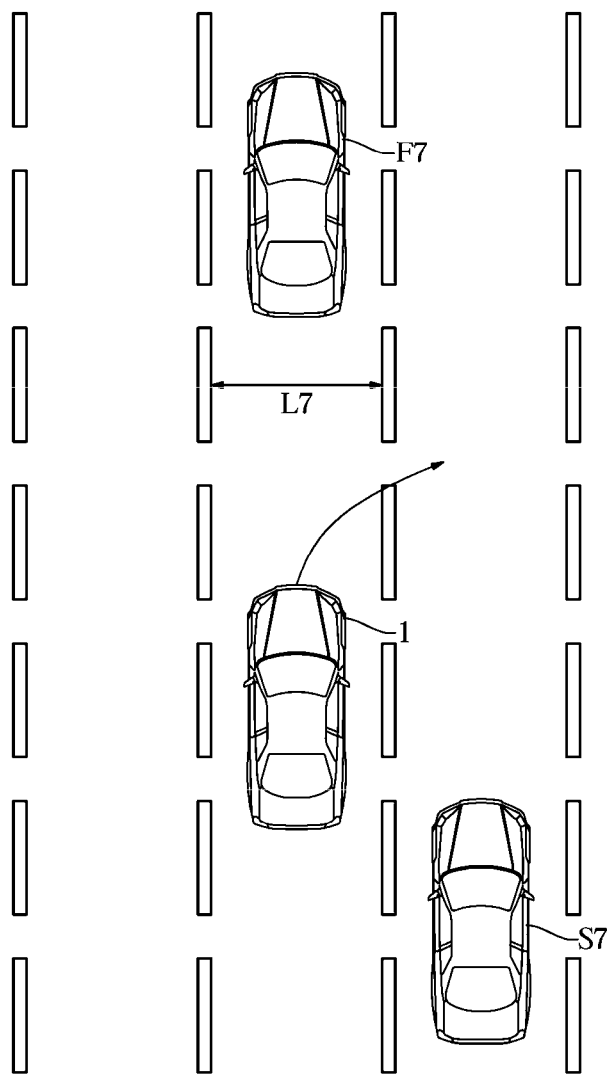
[FIG. 7]

[FIG. 8]
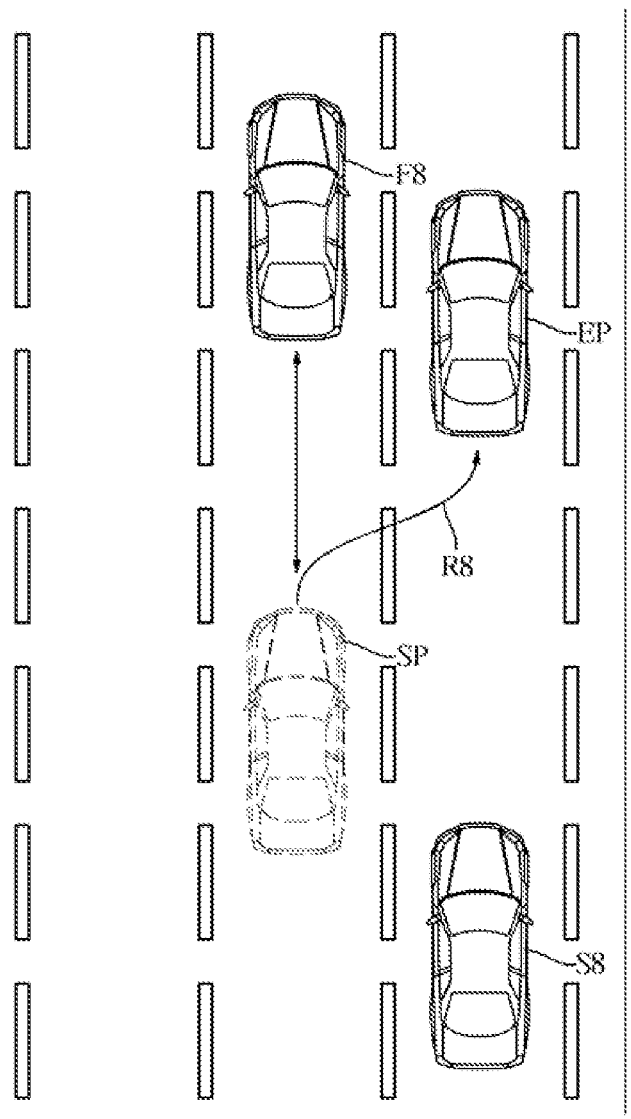

[FIG. 9]
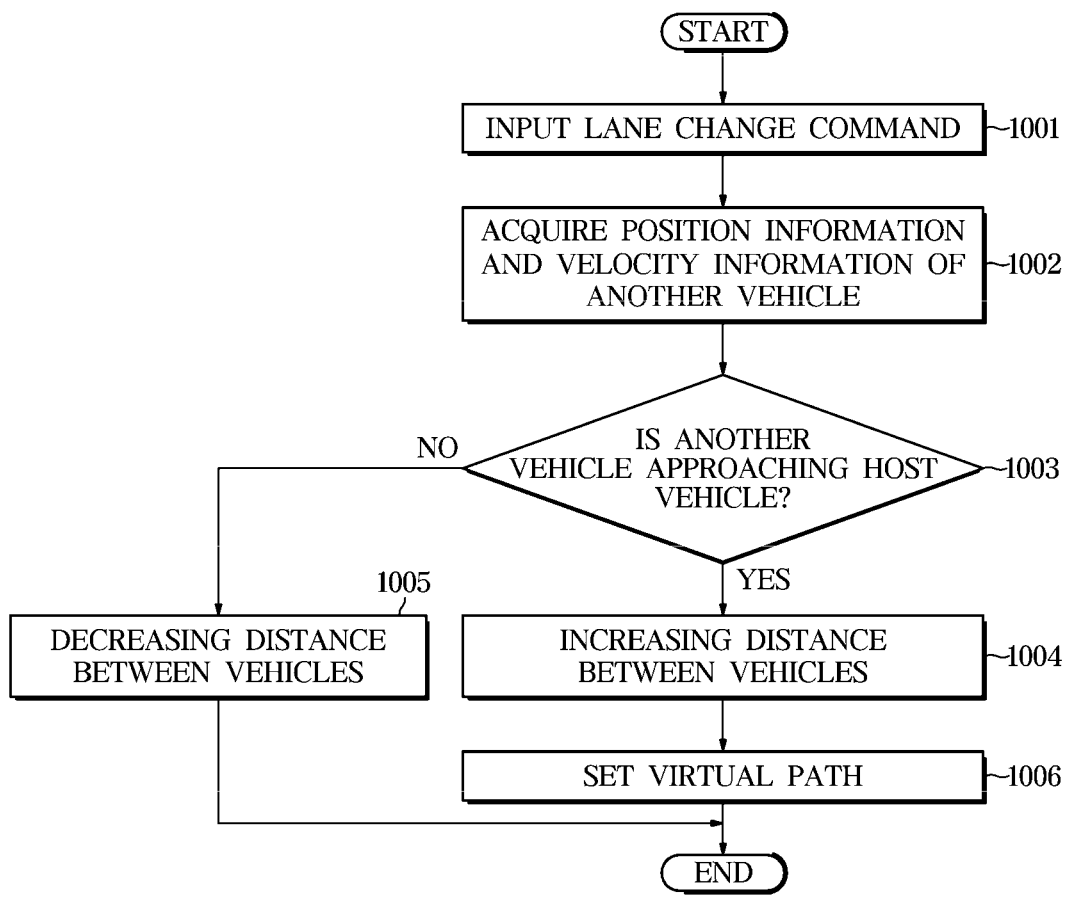

APPARATUS FOR ASSISTING DRIVING AND METHOD THEREOF

CROSS-REFERENCE TO RELATED APPLICATION

This application is based on and claims priority under 35 U.S.C. § 119 to Korean Patent Application No. 10-2020-0048066, filed on Apr. 21, 2020 in the Korean Intellectual Property Office, the disclosure of which is incorporated herein by reference.

BACKGROUND

1. Field

The present disclosure relates to a driver assistance system, and more particularly, to a driver assistance system capable of avoiding a rear side collision.

2. Description of the Related Art

Generally, a vehicle refer to a moving means or a transportation means that travels on a road or track using fossil fuel, electricity, or the like as a power source. Vehicles may be moved to various positions mainly by using one or more wheels mounted on the vehicle body. The vehicle may be moved to various positions mainly by using one or more wheels installed on the vehicle body. Such a vehicle may include a three-wheeled or four-wheeled vehicle, a two-wheeled vehicle such as a motorcycle, a construction machine, a bicycle, and a train running on a rail disposed on a track.

Vehicles are the most common transportation means in modern society, and the number of people using the vehicles is increasing. Due to the development of vehicle technology, long-distance movements are easy and life is easy, but in places with high population density, such as in Korea, road traffic conditions deteriorate and traffic congestion often occurs.

Recently, in order to reduce the burden on the driver and improve convenience, studies on vehicles equipped with an advanced driver assistance system (ADAS) that actively provides information on vehicle state, driver state, and surrounding environment has been actively conducted.

Examples of advanced driver assistance systems mounted on vehicles include Forward Collision Avoidance (FCA), Autonomous Emergency Brake (AEB), and Driver Attention Warning (DAW).

SUMMARY

Therefore, it is an aspect of the present disclosure to provide a driver assistance system and a control method thereof capable of performing autonomous driving safely and efficiently by adjusting a distance between a host vehicle and a preceding vehicle when changing lanes.

Additional aspects of the disclosure will be set forth in part in the description which follows and, in part, will be obvious from the description, or may be learned by practice of the disclosure.

In accordance with one aspect of the present disclosure, there is provided an apparatus for assisting driving of a host vehicle, the apparatus comprising: a first sensor mounted to a host vehicle and having a field of view in front of the host vehicle, the first sensor configured to acquire front image data; a second sensor selected from a group consisting of a radar sensor and a Light Detection and Ranging (LiDAR) sensor and mounted to the host vehicle, the second sensor configured to have a field of sensing in front of the host vehicle and acquire front sensing data; a third sensor selected from a group consisting of a radar sensor and a LiDAR sensor and mounted to the host vehicle, the third sensor configured to have a field of sensing behind the vehicle and acquire rear side sensing data; and a controller including a processor configured to process the front side sensing data and the rear side sensing data; wherein the controller is configured to: in response to a lane change command being input, acquire position information and velocity information of other vehicle traveling in another lane corresponding to the lane change command based on the rear side sensing data, and output a driving signal for changing a distance between the host vehicle and a preceding vehicle based on the position information and the velocity information of the other vehicle.

In response to the distance between the other vehicle and the host vehicle decreasing, the controller may output the driving signal for increasing the distance between the vehicle and the preceding vehicle.

The controller may output the driving signal for reducing a velocity of the host vehicle at a predetermined ratio.

In response to the distance between the other vehicle and the host vehicle increasing, the controller may output the driving signal for reducing the distance between the vehicle and the preceding vehicle.

In response to the distance between the other vehicle and the host vehicle increasing, the controller may output the driving signal for increasing a velocity of the vehicle at a predetermined ratio.

The controller may output the driving signal for changing the distance between the host vehicle and the preceding vehicle base on velocity information of the host vehicle.

In response to a velocity of the host vehicle being less than a velocity of the other vehicle, the controller may output the driving signal for increasing the distance between the host vehicle and the preceding vehicle.

In response to a velocity of the host vehicle being greater than a velocity of the other vehicle, the controller may output the driving signal for reducing the distance between the host vehicle and the preceding vehicle.

The controller may output the driving signal for changing the distance between the host vehicle and the preceding vehicle based on a width of a self-lane on which the host vehicle travels.

The controller may generate a virtual path from the self-lane to the other lane based on the changed distance between the host vehicle and the preceding vehicle and position information of the other lane.

It is an aspect of the present disclosure to provide a method of controlling an apparatus for assisting driving of a host vehicle, the method comprising: acquiring front image data; acquiring front sensing data; acquiring rear side sensing data; and in response to a lane change command being input, acquiring position information and velocity information of other vehicle traveling in another lane corresponding to the lane change command based on the rear side sensing data, and outputting a driving signal for changing a distance between the host vehicle and a preceding vehicle based on the position information and velocity information of the other vehicle.

The outputting of the driving signal may include, in response to the distance between the other vehicle and the host vehicle decreasing, outputting the driving signal for increasing the distance between the host vehicle and the preceding vehicle.

The outputting of the driving signal may include outputting the driving signal for reducing a velocity of the host vehicle at a predetermined ratio.

The outputting of the driving signal may include, in response to the distance between the other vehicle and the vehicle increasing, outputting the driving signal for reducing the distance between the other vehicle and the host vehicle.

The outputting of the driving signal may include, in response to the distance between the other vehicle and the host vehicle increasing, outputting the driving signal for increasing a velocity of the host vehicle at a predetermined ratio.

The outputting of the driving signal may include outputting the driving signal for changing the distance between the host vehicle and the preceding vehicle based on velocity information of the host vehicle.

The outputting of the driving signal may include, in response to a velocity of the host vehicle being less than a velocity of the other vehicle, outputting the driving signal for increasing the distance between the host vehicle and the preceding vehicle.

The outputting of the driving signal may include, in response to a velocity of the host vehicle being greater than a velocity of the other vehicle, outputting the driving signal for reducing the distance between the host vehicle and the preceding vehicle.

The outputting of the driving signal may include outputting the driving signal for changing the distance between the host vehicle and the preceding vehicle based on a width of a self-lane on which the host vehicle travels.

The outputting of the driving signal may include generating a virtual path from the self-lane to the other lane based on the changed distance between the host vehicle and the preceding vehicle and position information of the other lane.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an embodiment.

FIG. 2 illustrates a configuration of a driver assistance system according to an embodiment.

FIG. 3 illustrates a camera and a radar included in a driver assistance system according to an embodiment.

FIG. 4 is a diagram for explaining a distance between a host vehicle and a preceding vehicle according to an embodiment.

FIG. 5 is a diagram illustrating an operation in case of another vehicle approaches a host vehicle according to an embodiment.

FIG. 6 is a diagram for explaining an operation in case of another vehicle moves away from a host vehicle according to an embodiment.

FIG. 7 is a diagram for explaining a lane change operation based on a lane width on which a host vehicle travels, according to an embodiment.

FIG. 8 is a diagram for explaining an operation of generating a virtual path for vehicle change according to an embodiment.

FIG. 9 is a flow chart according to an embodiment.

DETAILED DESCRIPTION

Like numerals refer to like elements throughout the specification. Not all elements of embodiments of the present disclosure will be described, and description of what are commonly known in the art or what overlap each other in the embodiments will be omitted.

The terms as used throughout the specification, such as part", module", member", block", etc., may be implemented in software and/or hardware, and a plurality of parts", modules", members", or blocks" may be implemented in a single element, or a single part", module", member", or block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 illustrates a configuration of a vehicle according to an embodiment.

As shown in FIG. 1, the host vehicle 1 includes an engine 10, a transmission 20, a braking device 30, and a steering device 40. The engine 10 includes a cylinder and a piston, and may generate power for the host vehicle 1 to travel. The transmission 20 includes a plurality of gears, and may transmit power generated by the engine 10 to a wheel. The braking device 30 may decelerate the host vehicle 1 or stop the host vehicle 1 through friction with the wheel. The steering device 40 may change the driving direction of the host vehicle 1.

The vehicle 1 may include a plurality of electric components. For example, the host vehicle 1 further includes an engine management system (EMS) 11, a transmission control unit (TCU) 21, an electronic brake control module 31, an electronic power steering (EPS) 41, a body control module (BCM), and a driver assistance system (DAS).

The EMS 11 may control the engine 10 in response to a driver's acceleration intention through an accelerator pedal or a request from the driver assistance system 100. For example, the EMS 11 may control the torque of the engine 10.

The TCU 21 may control the transmission 20 in response to a driver's shift command through a shift lever and/or a driving velocity of the host vehicle 1. For example, the TCU 21 may adjust a shift ratio from the engine 10 to the wheel.

The electronic braking control module 31 may control the braking device 30 in response to a driver's braking intention through a braking pedal and/or slip of wheels. For example, the electronic braking control module 31 may temporarily release the braking of the wheel in response to the slip of a wheel detected when the host vehicle 1 is braking (Anti-lock Braking Systems, ABS). The electronic brake control module 31 may selectively release the braking of the wheel in response to oversteering and/or understeering detected when the host vehicle 1 is steered (Electronic stability control, ESC). In addition, the electronic brake control module 31 may temporarily brake the wheel in response to the slip of the wheel detected when the host vehicle 1 is driven (Traction Control System, TCS).

The electronic steering device 41 may assist the operation of the steering device 40 so that a driver can easily manipulate the steering wheel in response to the driver's steering intention through the steering wheel. For example, the electronic steering device 41 may assist the operation of the steering device 40 so as to reduce a steering force when driving at a low velocity or park, and increase the steering force when driving at a high velocity.

The BCM 51 may control the operation of electronic components that provide convenience to the driver or ensure safety of the driver. For example, the BCM 51 may control a head lamp, a wiper, a cluster, a multi-function switch, and a direction indicator lamp.

The DAS 100 may assist the driver in manipulating (driving, braking, steering) the host vehicle 1. For example, the DAS 100 may detect a surrounding environment (e.g., another vehicle, a pedestrian, a cyclist, a lane, a road sign, etc.) around the host vehicle 1 and control the driving and/or braking and/or steering of the host vehicle 1 in response to the sensed surrounding environment.

Meanwhile, the above-described configurations may be provided with a driving portion 200 configured to perform acceleration and deceleration of the vehicle.

The DAS 100 may provide the driver with various functions. For example, the DAS 100 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The DAS 100 may include a camera module 101 for acquiring image data around the host vehicle 1 and a radar module 102 for acquiring obstacle data around the host vehicle 1. The camera module 101 may include a camera 101*a* and an electronic control unit (ECU) 101*b*, and may photograph the front of the host vehicle 1 and recognize other vehicles, pedestrians, cyclists, lanes, road signs, and the like. The radar module 102 may include a radar 102*a* and an electronic control unit (ECU) 102*b* and may acquire relative positions and relative velocities of obstacles (e.g., other vehicles, pedestrians, cyclists, and the like) around the host vehicle 1.

The DAS 100 is not limited to the diagram illustrated in FIG. 1, and may further include a LiDAR configured to scan around the host vehicle 1 and detect the obstacles.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. For example, the DAS 100 may transmit a driving control signal, a driving signal, and a steering signal to the EMS 11, the electronic braking control module 31, and the EPS 41 through a vehicle communication network NT, respectively.

FIG. 2 illustrates a configuration of a DAS according to an embodiment. FIG. 3 illustrates a camera and a radar included in a DAS according to an embodiment.

As shown in FIG. 2, the host vehicle 1 may include the driving portion 200 and a driver assistance system 100.

The driving portion 200 may include various components contributing to driving the vehicle described in FIG. 1.

The DAS 100 may include a front camera 110, a front radar 120, and a plurality of corner radars 130.

The front camera 110 may have a field of view 110*a* directed to the front of the host vehicle 1 as shown in FIG. 3. The front camera 110 may be installed, for example, on the front windshield of the host vehicle 1.

The front camera 110 may photograph image the front of the host vehicle 1 and acquire image data regarding the front of the host vehicle 1. The image data regarding the front of the host vehicle 1 may include position with respect to another vehicle or pedestrian or cyclist or lane located in front of the host vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the host vehicle 1 to the controller 140.

The front radar 120 may have a field of sensing 120*a* directed to the front of the host vehicle 1 as shown in FIG. 3. The front radar 120 may be installed, for example, on a grille or a bumper of the host vehicle 1.

The front radar 120 may include a transmission antenna (or a transmission antenna array) that radiates transmission radio waves to the front of the host vehicle 1 and a reception antenna (or a reception antenna array) that receives reflection radio waves reflected from an obstacle. The front radar 120 may acquire front radar data from the transmission radio waves transmitted by the transmission antenna and the reflection radio waves received by the reception antenna. Front radar data may include position information and velocity information regarding another vehicle, a pedestrian, or a cyclist located in front of the host vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the host vehicle 1, a second corner radar 132 installed on the front left side of the host vehicle 1, a third corner radar 133 installed on the rear right side of the host vehicle 1, and a fourth corner radar 134 installed on the rear left side of the host vehicle 1.

The first corner radar 131 may have a field of sensing 131a directed to the front right side of the host vehicle 1. The first corner radar 131 may be installed on the right side of a front bumper of the host vehicle 1. The second corner radar 132 may have a field of sensing 132a directed to the front left side of the host vehicle 1, and for example, may be installed on the left side of the front bumper of the host vehicle 1. The third corner radar 133 may have a field of sensing 133a directed to the rear right side of the host vehicle 1 and for example, may be installed on the right side of a rear bumper of the host vehicle 1. The fourth corner radar 134 may have a field of sensing 134a directed to the rear left side of the host vehicle 1 and for example, may be installed on the left side of the rear bumper of the host vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance and velocity information regarding another vehicle, a pedestrian or a cyclist (hereinafter, referred to as "an obstacle") existing on the front right side of the host vehicle 1. The second corner radar data may include distance information and velocity information regarding an obstacle existing on the front left side of the host vehicle 1. The third and fourth corner radar data may respectively include distance and velocity information regarding an obstacle existing on the rear right side of the host vehicle 1 and distance and velocity information regarding an object located on the rear left side of the host vehicle 1, respectively.

Each of the first, second, third, and fourth corner radars 131, 132, 133 and 134 may be connected to the controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU 101b (see FIG. 1) of the camera module 101 (see FIG. 1) and/or the ECU 102b (see FIG. 1) of the radar module 102 (see FIG. 1), and/or a separate integrated ECU.

The controller 140 includes a processor 141 and a memory 142. The processor 141 may process the front image data of the front camera 110, the front radar data of the front radar 120, and the corner radar data of the plurality of corner radars 130, and generate a driving signal for controlling the driving portion 200.

For example, the processor 141 may include an image signal processor for processing the front image data of the front camera 110 and/or a digital signal processor for processing radar data of the radars 120 and 130 and/or a micro control unit (MCU) for generating a driving signal and/or a steering signal.

The processor 141 may detect obstacles (e.g., another vehicle, a pedestrian, a cyclist, and the like) in front of the host vehicle 1 based on the front image data of the front camera 110 and the front radar data of the radar 120.

In detail, the processor 141 may acquire position (distance and direction) and relative velocity of the obstacles in front of the host vehicle 1 based on the front radar data of the front radar 120. The processor 141 may acquire position (direction) and type information (for example, whether the obstacle is another vehicle, a pedestrian, a cyclist, or the like) of the obstacle existing in front of the host vehicle 1 based on the front image data of the front camera 110. In addition, the processor 141 may match the obstacles detected by the front image data with the obstacles detected by the front radar data, and acquire the type information, the position and the relative velocity of the obstacles in front of the host vehicle 1 based on a result of the matching.

The processor 141 may generate a driving signal based on the type information, the position, and the relative velocity of front obstacles.

For example, the processor 141 may calculate a time to collision (TTC) between the host vehicle 1 and the front obstacle based on the position (distance) and the relative velocity of the front obstacles, and transmit a driving signal to the driving portion 200 based on a result of comparing the TTC with a predetermined reference time.

As another example, the processor 141 may calculate a distance to collision (DTC) based on the relative velocity of front obstacles, and warn the driver of a collision or transmit a driving signal to the driving portion 200 based on a result of comparing the DTC with distances to the front obstacles.

The processor 141 may acquire position (distance and direction) and relative velocity of the obstacles on the sides of the host vehicle 1 (front right, front left, rear right, and rear left) based on corner radar data of the plurality of corner radars 130.

The processor 141 may transmit a driving signal to the driving portion 200 based on the position (distance and direction) and the relative velocity of the obstacles on the sides of the host vehicle 1.

For example, if a collision with the front obstacles is determined based on TTC or DTC, the processor 141 may transmit a driving signal to the driving portion 200 to avoid collision with the front obstacles.

The processor 141 may determine whether to avoid a collision with the front obstacles by changing the driving direction of the host vehicle 1 based on the position (distance and direction) and the relative velocity of the obstacles on the sides of the host vehicle 1.

For example, if there is no obstacle located on the sides of the host vehicle 1, the processor 141 may transmit a driving signal to the driving portion 200 in order to avoid a collision with the front obstacles.

If the collision with the obstacles on the sides is not predicted after the steering of the host vehicle 1 based on the position (distance and direction) and the relative velocity of the obstacles on the sides, the processor 141 may transmit a driving signal to the driving portion 200 to avoid a collision with the front obstacles.

If the collision with the obstacles on the sides is predicted after the steering of the host vehicle 1 based on the position (distance and direction) and the relative velocity of the obstacles on the sides, the processor 141 may not transmit the driving signal to the driving portion 200.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to the diagram illustrated in FIG. 2, and may further include a LiDAR configured to scan around the host vehicle 1 and detect obstacles.

As such, the controller 140 may transmit a driving signal to the driving portion 200 based on whether a collision with the front obstacles is predicted.

If the obstacles on the sides does not exist or the collision with the obstacles on the sides is not predicted, the controller 140 may transmit a driving signal to the driving portion 200 to avoid a collision with the front obstacles.

The inputter 300 may receive a lane change command of the user.

The inputter 300 includes a hardware device such as various buttons, switch, pedal, keyboard, mouse, track-ball, various levers, handle, stick, and the like for inputting of the user.

According to an embodiment, a user may turn on a direction indicator using a lever to change a lane, and the vehicle may perform a lane change operation based on this.

In addition, the inputter 300 may include a graphical user interface (GUI) such as a touch pad, that is, a software device for inputting of the user. The touch pad may be implemented as a touch screen panel (TSP) to form an inter layer structure with a display portion.

If it is composed of a touch screen panel (TSP) that forms an inter layer structure with a touch pad, the display portion may also be used as the inputter.

If the user inputs a lane change command through the inputter, the controller 140 may acquire position information and velocity information of another vehicle traveling in another lane corresponding to the lane change command based on rear-side sensing data.

Specifically, the third corner radar and the fourth corner radar described above may acquire position information and velocity information of another vehicle traveling in the rear side of the vehicle.

Specifically, the position information may include distance and direction information between the host vehicle and another vehicle.

The velocity information may include a relative velocity regarding another vehicle, and the like.

The controller may output a driving signal for changing a distance between the host vehicle and the other vehicle based on the position information and velocity information of the other vehicle.

The driving signal includes a driving signal and an acceleration signal, and refers to an overall signal involved in driving the vehicle.

If a distance between the host vehicle and the other vehicle decreases, the controller may output the driving signal to increase the distance between the host vehicle and the other vehicle.

If a distance between the host vehicle and the other vehicle decreases, the controller may output a driving signal for reducing the velocity of the vehicle at a predetermined ratio.

The decreasing in the distance between the other vehicle and the host vehicle may mean that the velocity of the other vehicle is faster than the velocity of the host vehicle.

The controller may output a driving signal for reducing an distance between vehicles if a distance between the host vehicle and the other vehicle increases.

The controller may output a driving signal for increasing the velocity of the vehicle at a predetermined ratio if a distance between the other vehicle and the host vehicle increases.

The controller may output a driving signal for changing a distance between the host vehicle and the preceding vehicle by further considering the velocity information of the vehicle.

That is, when the host vehicle changes a distance between vehicles, it is possible to change the distance between vehicles in consideration of not only the velocity of the other vehicle but also the velocity of the host vehicle itself.

Specifically, when the velocity of the host vehicle is less than the velocity of the other vehicle, the controller may output a driving signal for increasing the distance between the distance between the host vehicle and the other vehicle.

In this case, the velocity of the other vehicle is a case where the velocity of the host vehicle is high, and since it is safe and efficient for the host vehicle to try to change lanes after the other vehicle proceeds first, the distance between the host vehicle and the other vehicle can be increased.

If the velocity of the host vehicle exceeds the velocity of the other vehicle, the controller may output a driving signal for reducing the distance between the host vehicle and the other vehicle.

In this case, the velocity of the other vehicle is a case where the velocity of the host vehicle is slow, and since it is safe and efficient to try to change lanes quickly, the distance between the host vehicle and the other vehicle can be increased.

The controller may output a driving signal for changing a distance between the host vehicle and the preceding vehicle based on the width of the self lane on which the host vehicle travels.

The controller may generate a virtual path from the self lane to the other lane based on changed distance between the host vehicle and the other vehicle and position information of the other lane.

The above-described operation will be described in detail below.

At least one component may be added or deleted corresponding to the performance of the components of the driver assistance system illustrated in FIG. 3.

In addition, it will be readily understood by those skill in the art that the mutual positions of the components may be changed in response to the performance or structure of the system.

Meanwhile, each component illustrated in FIG. 3 refers to software and/or hardware components such as a Field Programmable Gate Array (FPGA) and an Application Specific Integrated Circuit (ASIC).

FIG. 4 is a diagram for explaining a distance between a host vehicle and a preceding vehicle according to an embodiment of the present disclosure.

Referring to FIG. 4, the vehicle may acquire position information of the preceding vehicle based on signals from the camera module 101, the front radar 120*a*, the first corner radar 131 and the second corner radar 132.

Accordingly, the host vehicle can acquire the distance to the preceding vehicle F4. The distance between the host vehicle and the preceding vehicle F4 may mean a distance between vehicles d4.

Meanwhile, the vehicle may increase the distance between vehicles d4 by reducing the velocity, and may decrease the distance between vehicles d4 by increasing the velocity.

Meanwhile, a driving signal output from the controller may be used to change the distance between vehicles of such a vehicle.

The driving signal may mean a signal for controlling the driving portion 200 of the vehicle. The drive signal includes a signal for accelerating and braking the vehicle.

According to an embodiment, when the controller outputs a driving signal for accelerating the vehicle, the distance between vehicles may decrease.

On the other hand, when the controller outputs a driving signal for decelerating or braking the vehicle, the distance between vehicles may increase.

FIG. 5 is a diagram illustrating an operation in case of another vehicle approaches a host vehicle according to an embodiment, and FIG. 6 is a diagram for explaining an operation in case of another vehicle moves away from a host vehicle according to an embodiment.

Referring to FIGS. 5 and 6, the vehicle may acquire position information of the other vehicle S5 and S6 located at the rear side of the vehicle based on the signal acquired from the third corner radar 133 and the fourth corner radar 134.

Referring to FIG. 5, FIG. 5 shows a case where the other vehicle S5 approaches the host vehicle 1. In this case, the other vehicle S5 approaches host the vehicle, and the velocity of the other vehicle exceeds the velocity of the host vehicle.

When the user inputs a lane change command, the vehicle may not immediately attempt to change lanes, recognize that another vehicle is approaching, and increase the distance between vehicles d5 between the vehicles.

In the case of FIG. 5, when the host vehicle changes lanes after the other vehicle first changes lanes, it is possible to avoid a collision with other vehicle, and the host vehicle may increase the distance between vehicles.

Increasing the distance between vehicles by the vehicle may be accomplished by the controller outputting a driving signal that decelerates the velocity of the vehicle.

Meanwhile, referring to FIG. 6, FIG. 6 shows a case where the other vehicle S6 is separated from the host vehicle. In this case, the other vehicle S6 moves away from the host vehicle, and the velocity of the other vehicle S6 is slower than the velocity of the host vehicle 1.

When the user inputs a lane change command, the host vehicle may quickly perform lane change first before the slow other vehicle S6 approaches.

In the case of FIG. 6, when the host vehicle changes lane before proceeding with the other vehicle S6, a collision with another vehicle may be avoided, and the host vehicle may reduce the distance between vehicles.

Reducing of the distance between vehicles by the vehicle may be achieved by the controller outputting a driving signal that increases the velocity of the host vehicle.

Meanwhile, the operations described in FIGS. 5 and 6 are only an exemplary embodiment for describing the operation of the present disclosure, and there is no limitation on the operation of changing a distance between the preceding vehicle and the host vehicle in consideration of the position and velocity of the other vehicle.

FIG. 7 is a diagram for explaining a lane change operation based on a lane width on which a host vehicle travels, according to an embodiment.

Referring to FIG. 7, the host vehicle may consider a lane width L7 to change lanes.

Specifically, if the width of the lane on which the host vehicle 1 travels is wide, the vehicle may attempt to change the lanes in consideration of the position and velocity of the other vehicle S7 and the lane width L7.

For example, if the lane width L7 is greater than a predetermined value, it may take a lot of time for the host vehicle 1 to change lanes, so the controller may output a driving signal for accelerating the host vehicle when the lane is changed.

On the other hand, when the lane width is narrow, a driving signal for accelerating the host vehicle may not be output, such as when the lane width L7 exceeds a predetermined value in changing lanes.

Meanwhile, the operation described in FIG. 7 is only an embodiment of the operation of the present disclosure in consideration of the lane distance, and there is no limitation on the operation of outputting a driving signal using the lane width.

FIG. 8 is a diagram for explaining an operation of generating a virtual path for vehicle change according to an embodiment of the present disclosure.

Referring to FIG. 8, the vehicle may generate a virtual path attempting to change lanes.

The vehicle may determine a starting position (SP) to start the change and a final position (EP) in changing lanes.

Meanwhile, the start position SP may be determined based on a change in the distance between vehicles as described above. Specifically, when the other vehicle S8 approaches in forming a virtual path, a point at which the distance between vehicles is increased may be determined as a starting point.

Meanwhile, the vehicle may acquire a virtual path R8 capable of changing lanes while avoiding a collision with the other vehicle S8.

This path allows the vehicle to change lanes to the next lane.

Meanwhile, FIG. 8 shows an embodiment of a virtual path generated by a vehicle, and there is no limitation on the virtual path acquired by the vehicle to change lanes.

FIG. 9 is a flow chart according to an embodiment.

Referring to FIG. 9, the user may input a lane change command (1001).

The host vehicle may acquire position information and velocity information of the other vehicle (1002).

The host vehicle may identify whether other approaches the host vehicle (1003).

Meanwhile, if the other vehicle having a higher velocity than the host vehicle approaches the host vehicle, the host vehicle may increase a distance between the preceding vehicle and the host vehicle (1004).

In addition, when the other vehicle moves away from the host vehicle without approaching the host vehicle, the host vehicle may reduce a distance between the preceding vehicle and the host vehicle in order to change lanes (1005).

Meanwhile, the host vehicle may set a virtual path in a situation in which the distance between the preceding vehicle and the host vehicle is increased or decreased (1006).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As described above, the driver assistance system and the control method thereof according to an embodiment can safely and efficiently perform autonomous driving by adjusting the distance between the host vehicle and the preceding vehicle when changing lanes.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An apparatus for assisting driving of a host vehicle, the apparatus comprising:
    a first sensor mounted to a host vehicle and having a field of view in front of the host vehicle, the first sensor configured to acquire front image data;
    a second sensor selected from a group consisting of a radar sensor and a Light Detection and Ranging (Li-DAR) sensor and mounted to the host vehicle, the second sensor configured to have a field of sensing in front of the host vehicle and acquire front sensing data;
    a third sensor selected from a group consisting of a radar sensor and a LiDAR sensor and mounted to the host vehicle, the third sensor configured to have a field of sensing behind the host vehicle and acquire rear side sensing data; and
    a controller including a processor configured to process the front sensing data and the rear side sensing data,
    wherein the controller is configured to:
    in response to a lane change command being input, acquire position information and velocity information of other vehicle traveling in another lane corresponding to the lane change command based on the rear side sensing data,
    output a driving signal for changing a distance between the host vehicle and a preceding vehicle traveling on a self-lane on which the host vehicle also travels based on the position information and the velocity information of the other vehicle, and
    after performing autonomous driving by adjusting the distance between the host vehicle and the preceding vehicle based on the driving signal, changing a driving lane of the host vehicle from the self-lane to the another lane.

2. The apparatus of claim 1, wherein in response to the distance between the other vehicle and the host vehicle decreasing, the controller is configured to output the driving signal for increasing the distance between the host vehicle and the preceding vehicle.

3. The apparatus of claim 2, wherein the controller is configured to output the driving signal for reducing a velocity of the host vehicle at a predetermined ratio.

4. The apparatus of claim 1, wherein in response to the distance between the other vehicle and the host vehicle increasing, the controller is configured to output the driving signal for reducing the distance between the vehicle and the preceding vehicle.

5. The apparatus of claim 4, wherein in response to the distance between the other vehicle and the host vehicle increasing, the controller is configured to output the driving signal for increasing a velocity of the host vehicle at a predetermined ratio.

6. The apparatus of claim 1, wherein the controller is configured to output the driving signal for changing the distance between the host vehicle and the preceding vehicle based on velocity information of the host vehicle.

7. The apparatus of claim 6, wherein in response to a velocity of the host vehicle being less than a velocity of the other vehicle, the controller is configured to output the driving signal for increasing the distance between the host vehicle and the preceding vehicle.

8. The apparatus of claim 6, wherein in response to a velocity of the host vehicle being greater than a velocity of the other vehicle, the controller is configured to output the driving signal for reducing the distance between the host vehicle and the preceding vehicle.

9. The apparatus of claim 1, wherein the controller is configured to output the driving signal for changing the distance between the host vehicle and the preceding vehicle based on a width of the self-lane on which the host vehicle travels.

10. The apparatus of claim 9, wherein the controller is configured to generate a virtual path from the self-lane to the another lane based on the changed distance between the host vehicle and the preceding vehicle and position information of the another lane.

11. A method of controlling an apparatus for assisting driving of a host vehicle, the method comprising:
    acquiring front image data; acquiring front sensing data; acquiring rear side sensing data; and
    in response to a lane change command being input, acquiring position information and velocity information of other vehicle traveling in another lane corresponding to the lane change command based on the rear side sensing data, outputting a driving signal for changing a distance between the host vehicle and a preceding vehicle traveling on a self-lane on which the host vehicle also travels based on the position information and velocity information of the other vehicle, and after performing autonomous driving by adjusting the distance between the host vehicle and the preceding vehicle based on the driving signal, changing a driving lane of the host vehicle from the self-lane to the another lane.

12. The method of claim 11, wherein the outputting of the driving signal includes, in response to the distance between the other vehicle and the host vehicle decreasing, outputting the driving signal for increasing the distance between the host vehicle and the preceding vehicle.

13. The method of claim 12, wherein the outputting of the driving signal includes outputting the driving signal for reducing a velocity of the host vehicle at a predetermined ratio.

14. The method of claim 11, wherein the outputting of the driving signal includes, in response to the distance between the other vehicle and the vehicle increasing, outputting the driving signal for reducing the distance between the other vehicle and the host vehicle.

15. The method of claim 14, wherein the outputting of the driving signal includes, in response to the distance between the other vehicle and the host vehicle increasing, outputting the driving signal for increasing a velocity of the host vehicle at a predetermined ratio.

16. The method of claim 11, wherein the outputting of the driving signal includes outputting the driving signal for changing the distance between the host vehicle and the preceding vehicle based on velocity information of the host vehicle.

17. The method of claim 16, wherein the outputting of the driving signal includes, in response to a velocity of the host vehicle being less than a velocity of the other vehicle, outputting the driving signal for increasing the distance between the host vehicle and the preceding vehicle.

18. The method of claim 16, wherein the outputting of the driving signal includes, in response to a velocity of the host vehicle being greater than a velocity of the other vehicle, outputting the driving signal for reducing the distance between the host vehicle and the preceding vehicle.

19. The method of claim 11, wherein the outputting of the driving signal includes outputting the driving signal for changing the distance between the host vehicle and the preceding vehicle based on a width of the self-lane on which the host vehicle travels.

20. The method of claim 19, wherein the outputting of the driving signal includes generating a virtual path from the self-lane to the another lane based on the changed distance between the host vehicle and the preceding vehicle and position information of the another lane.

\* \* \* \* \*